United States Patent Office 3,420,798
Patented Jan. 7, 1969

---

3,420,798
CROSS-LINKED POLYMERS OF LACTONIZED POLY (METHYL PROPENOL/METHACRYLIC ACID) AND METHOD OF PREPARING BY APPLYING HEAT
Wayne E. Smith, Shawnee, and Dru W. Alwani, Merriam, Kans., and Harry D. Anspon, Kansas City, Mo., assignors to Gulf Oil Corporation, Pittsburgh, Pa., a corporation of Pennsylvania
No Drawing. Filed June 23, 1965, Ser. No. 466,425
U.S. Cl. 260—67                2 Claims
Int. Cl. C08f 3/40

---

ABSTRACT OF THE DISCLOSURE

Cross-linked polymers of partially lactonized poly(methyl propenol/methacrylic acid) derived from polymethacrolein with aldehyde and acetal groups reduced and oxidized to substantially equal numbers of hydroxyl and carboxyl groups are prepared by simply heating or heating in the presence of cross-linking agents such as butyl acid phosphate.

---

This invention relates to the modification of polymethacrolein derivatives and more particularly to the preparation of shaped structures, such as films, foils, coatings, and the like, from cross-linked derivatives of polymethacrolein.

Various methods of polymerizing methacrolein are known. Among these procedures, there are for example mass polymerization, suspension polymerization and emulsion polymerization systems. The resultant products are polymers in which some of the aldehyde groups cyclicize to acetal groups to provide repeating units of the structure

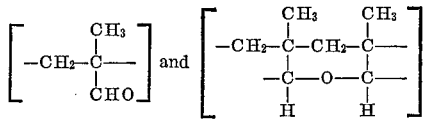

the aldehyde and cyclic acetal groups of which can be utilized to prepare polymethacrolein derivatives.

Processes for the preparation of polymethacrolein derivatives by Cannizzaro-type reactions are also known. These Cannizzaro-type reaction products can be prepared by reacting polymethacrolein, preferably in the form of an emulsion, with a base at a pH of 8 or more. Typical bases include water soluble alkali metal hydroxides, such as sodium, potassium and lithium hydroxides, and strong organic bases such as diisobutyl and tertiary amines.

These Cannizzaro-type reactions reduce part of the aldehyde and acetal groups of the methacrolein polymer to hydroxyl groups and oxidize another equivalent part of the aldehyde and acetal groups to carboxyl groups which, in turn, react with the base to form the corresponding salt. Normally, the amount of base added will range from about 70 percent up to about 150 percent or more of the theoretical amount of the base depending on the degree of conversion desired.

These Cannizzaro-type reaction products are commonly known as poly(methyl propenol/methacrylic acid salts), are readily soluble in water, and contain recurring units of the structures

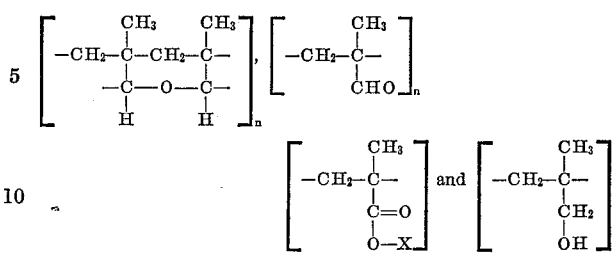

where X is a cation of the base employed, and where $n$ may be zero or an integer.

These Cannizzaro-type reaction products readily react with acids to yield essentially the acid form thereof, e.g. poly(methyl propenol/methacrylic acid), having repeating units of the structures

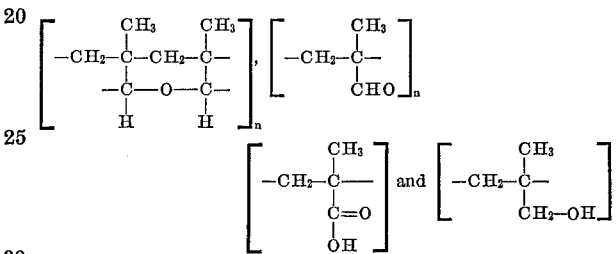

where again $n$ may be zero or an integer.

The free acid is readily converted into a partial lactone structure on heating and drying. In general, the amount of lactone is increased as the temperature is increased from 30° C. to 150° C. where the product is about 90 percent lactonized. The formation of the lactone from the acid form is illustrated below, assuming $n$ to be equal to zero for the aldehyde and acetal groups,

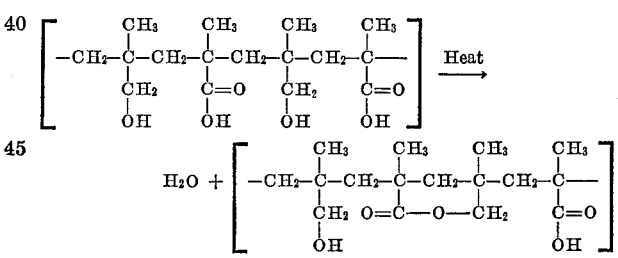

Heretofore no utility has been known for the polyactone, and its formation has been generally avoided. These prior art polylactones, and particularly the 80 percent lactonized products, were insoluble in water and insoluble in bases and acids, and were characterized by brittleness, which has prevented their use for any known purpose.

It has now been discovered that valuable, shaped, thermoset structures, such as filaments, foils, films, ribbons, and the like, can be obtained from a lactonized polymer of poly(methyl propenol/methacrylic acid) containing at least 20 mole percent of the repeating lactone groups having the structure, including mirror images thereof,

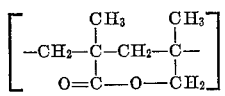

and not more than about 10 weight percent of the aldehyde grouping

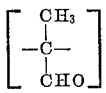

or the acetal form thereof. Preferably, the lactonized polymer will be free of aldehyde and acetal groups and contain up to about 90 mole percent of the above lactone groups.

The molecular weights of these lactonized polymers will correspond to that of the base polymethacrolein employed, and in general the more practical of these lactonized polymers are characterized by an inherent viscosity of about 0.1 to about 3.0, and preferably of about 0.5 to about 2.0, as determined by employing a 0.1 weight percent solution of the lactonized polymer in dimethylformamide at 30° C.

It was found that these lactonized polymers of poly (methyl propenol/methacrylic acid) are readily cross-linked by heating to and curing at elevated temperatures of at least about 200° C. to provide unique cross-linked transparent products having high grade physical properties and appearance. More particularly, the products have, among other properties, high clarity, high density and excellent physical properties such as tensile strength and hardness.

A direct cross-linking of the polymer, during curing, is effected by the intermolecular esterification of hydroxyl groups and carboxyl groups without the need of cross-linking agents or catalysts. However, it is to be understood that although catalysts are not required for the cross-linking reaction, they may be used, if desired, to promote the intermolecular esterification of the lactonized polymer; and thus any of the conventional esterification catalysts may be optionally employed, as for example p-toluene sulfonic acid, boron trifluoride, butyl acid phosphate, titanate esters, lithium-2-ethyl hexoate, etc.

There does not appear to be any upper temperature limit for the cross-linking reaction other than practical considerations of the thermal properties of the ultimately cross-linked product, and temperatures of up to about 300° C. have been employed to advantage. In other words, the upper curing temperature will be the temperature of thermal decomposition of the cross-linked product. Generally, heating of the lactonized polymer at a temperature of at least about 150° C. for at least 10 minutes in the presence of catalyst will be sufficient to cure the polymer in order to obtain the desired cross-linking. However, somewhat longer periods of time may be employed in the absence of a catalyst and/or to insure the completeness of the cure. In general, the specific time for the cure will vary to some extent depending on the presence or absence of a catalyst, on the molecular weight of the lactonized polymer, the degree of lactonization and the amount of cross-linking desired.

As noted above the lactonized polymer of poly(methyl propenol/methacrylic acid) of this invention is derived from polymethacrolein having at least about 40 percent of the aldehyde groups thereof reduced to substantially equal numbers of hydroxyl and carboxyl groups, a portion of which are in turn converted to lactone groups.

The polymethacrolein polymers of this invention can be prepared by any suitable method such as, for example, mass polymerization, suspension polymerization, solution polymerization, and emulsion polymerization systems. The suspension and emulsion systems are preferred since they provide a ready reaction medium for conversion of the polymer to the poly(methyl propenol/methacrylic acid salt), which is then converted to the lactonized, free acid/alcohol form.

These methacrolein polymers can be obtained in a wide range of molecular weights from about 700 to above 50,000 which can generally be utilized in this invention. However, for many practical purposes the polymethacroleins having a molecular weight of greater than about 5,000 are preferred. For practical purposes the molecular weight of the polymethacrolein polymers is best expressed in terms of inherent viscosity as determined by employing a 0.1 percent solution of the polymethacrolein in dimethylformamide at 30° C. In general, the inherent viscosities of the polymethacrolein will normally be, for practical purposes, in a range of about 0.1 to about 3.0, and preferably from about 0.5 to about 2.0. However, polymethacroleins of higher or lower inherent viscosities may be employed in order to obtain special properties in the final product. In general, it is only necessary that the polymethacrolein be of sufficiently high molecular weight so that shaped, lactonized derivatives thereof can be molded, formed into filaments and films, and possess the characteristics, on curing, of transparency, tensile strength, etc.

In one method of preparing shaped products from polylactone solutions, films can be prepared by casting an intermediate film product from a solution thereof in a volatile organic solvent on a support or casting surface, evaporating the solvent below curing temperatures, generally below about 50° C., and curing the intermediate product at temperatures above about 100° C. In addition, the lactonized polymers of this invention can also be molded at suitable temperatures of about 200° C. to about 260° C. to provide a hard transparent product of excellent physical strength.

In the casting of films from polylactone solutions, the concentration of the solutions is preferably adjusted, for convenience, to provide a relatively low viscosity of about 300 to about 2,500 centpoises, particularly for the purpose of reducing the amount of solvent to be evaporated.

In general, as will be apparent to those skilled in the art, any volatile solvent for the lactonized polymer can be used in preparing the casting solution, as for example, dimethylformamide, tetrahydrofuran, mixtures of tetrahydrofuran and ethyl carbitol, pyridine, acetic acid, etc. Normally, the solvents will be organic in nature and capable of being evaporated without decomposition. For all practical purposes, any volatile organic solvent may be used which forms the desired polymer solution and which has the desired stability. The casting solution can normally be prepared by dissolving the lactonized polymer in a suitable solvent, such as dimethylformamide, tetrahydrofuran, and the like, and the solution heated to between about 30° C. and the boiling point of the solvent, and normally about 30 to 50° C. These casting solutions will generally have a lactonized polymer solids content of about 10 to 50 weight percent, and normally about 15 to 30 percent solids depending on the molecular weight of the lactonized polymer. For practical purposes, the concentration of the lactonized polymer in the solution should be such as to provide a sufficient viscosity to the solution for convenient and efficient casting thereof. Normally, the viscosity of the solution will be in the range of 300 to 2,500 centipoises.

If desired, various additives may be employed in the casting solution for control thereof in casting, i.e., viscosity, and the like, as is conventional in the art. Also, it may be desirable for various purposes to modify the polymeric compositions of this invention by the presence of other materials, such as, for example, pigments, dyes, plasticizers, color stabilizers, slip additives, lubricants, etc.

The following examples of this invention are given by way of illustration and not for limitation.

EXAMPLE I

Polymethacrolein was emulsion polymerized at 64–65° C. using the following charge:

| | Parts by weight |
|---|---|
| Water | 400 |
| Methacrolein | 100 |
| Sodium lauryl sulfate (Duponal C) | 3.0 |
| $K_2S_2O_8$ | 2.0 |

At the end of 4 hours the polymerization was substantially complete (97 percent).

350 parts by weight of polymethacrolein was reacted for three hours at 170–175° C. with 110 parts of sodium hydroxide (in 2390 mls. of water) in a Magne-Drive Reactor to give a colorless solution of poly(methyl propenol/sodium methacrylate).

The resultant solution of poly(methyl propenol/sodium methacrylate) was acidified at 45–50° C. with a 20 percent solution of hydrochloric acid to a pH of 1 and the precipitate was separated by filtration, washed and dried.

The resultant lactonized poly(methyl propenol/methacrylic acid) was dissolved in tetrahydrofuran to a 15 percent solution.

Films of the tetrahydrofuran solution were then evenly spread on a sheet of Mylar and the solvent evaporated therefrom at room temperature. The dried film was then heated at various temperatures for five minutes providing film of outstanding optical properties and tensile strength. The results are set forth below in Table I.

TABLE I

| Film sample | Temp., °C. | Time, mins. | Solubility in dimethyl formamide |
|---|---|---|---|
| 1 | (¹) | | Soluble. |
| 2 | 100 | 5 | Do. |
| 3 | 150 | 5 | Insoluble film softened only. |
| 4 | 200 | 5 | Insoluble. |
| 5 | 220 | 5 | Do. |
| 6 | 230 | 5 | Do. |

¹ Room temperature.

EXAMPLE II

A lactonized polymer was prepared as in Example I and was dissolved in tetrahydrofuran to a 20 percent concentration, to determine the effect of cross-linking catalysts.

To 20 grams of this solution was added 0.1 gram of butyl acid phosphate as a cross-linking catalyst. Films of the mixture were then cast on a sheet of Mylar, dried at room temperature, and cured at 150° C. for one hour. Films obtained in this example were insoluble in cold dimethylformamide (room temperature) and only gelled in boiling dimethylformamide (154° C.).

EXAMPLE III

Example II was repeated with the exception that the cast films obtained were heated at different temperatures for varying times to determine the effect of the heating on the curing of the films as determined by their solubility in hot dimethylformamide (150° C.). The results are set forth below in Table II:

TABLE II

| Film sample | Temp., °C. | Time, mins. | Solubility in hot dimethylformamide, 150° C. |
|---|---|---|---|
| 1 | (¹) | | Soluble. |
| 2 | 100 | 15 | Gelled only. |
| 3 | 100 | 30 | Do. |
| 4 | 100 | 45 | Do. |
| 5 | 100 | 60 | Do. |
| 6 | 150 | 15 | Do. |
| 7 | 150 | 30 | Do. |
| 8 | 150 | 45 | Do. |

¹ Room temperature.

Although the invention has been described with reference to specific materials, embodiments and details, various modifications, within the invention, will be apparent to one skilled in the art and are contemplated to be embraced within the invention.

What is claimed is:

1. The method for cross-linking polymers consisting essentially of heating a partially lactonzied polymer of poly(methyl propenol/methacrylic acid) at an elevated temperature for a time sufficient to cross-link said lactonized polymer with said lactonized polymer being
   (a) derived from polymethacrolein having the aldehyde and acetal groups thereof reduced and oxidized to substantially equal numbers of hydroxyl and carboxyl groups, and
   (b) containing recurring units of the structures

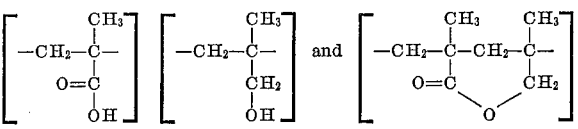

and said cross-linking method taking place at a temperature of at least about 100° C., and said lactonized polymer containing a cross-linking catalyst of butyl acid phosphate.

2. The process of claim 1 wherein the said polymer contains from about 20 to about 90 mol percent of the said recurring units

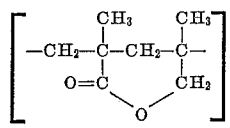

References Cited

FOREIGN PATENTS 803,053  10/1958  Great Britain.

WILLIAM H. SHORT, *Primary Examiner.*

L. M. PHYNES, *Assistant Examiner.*

U.S. Cl. X.R.

260—78.3